UNITED STATES PATENT OFFICE.

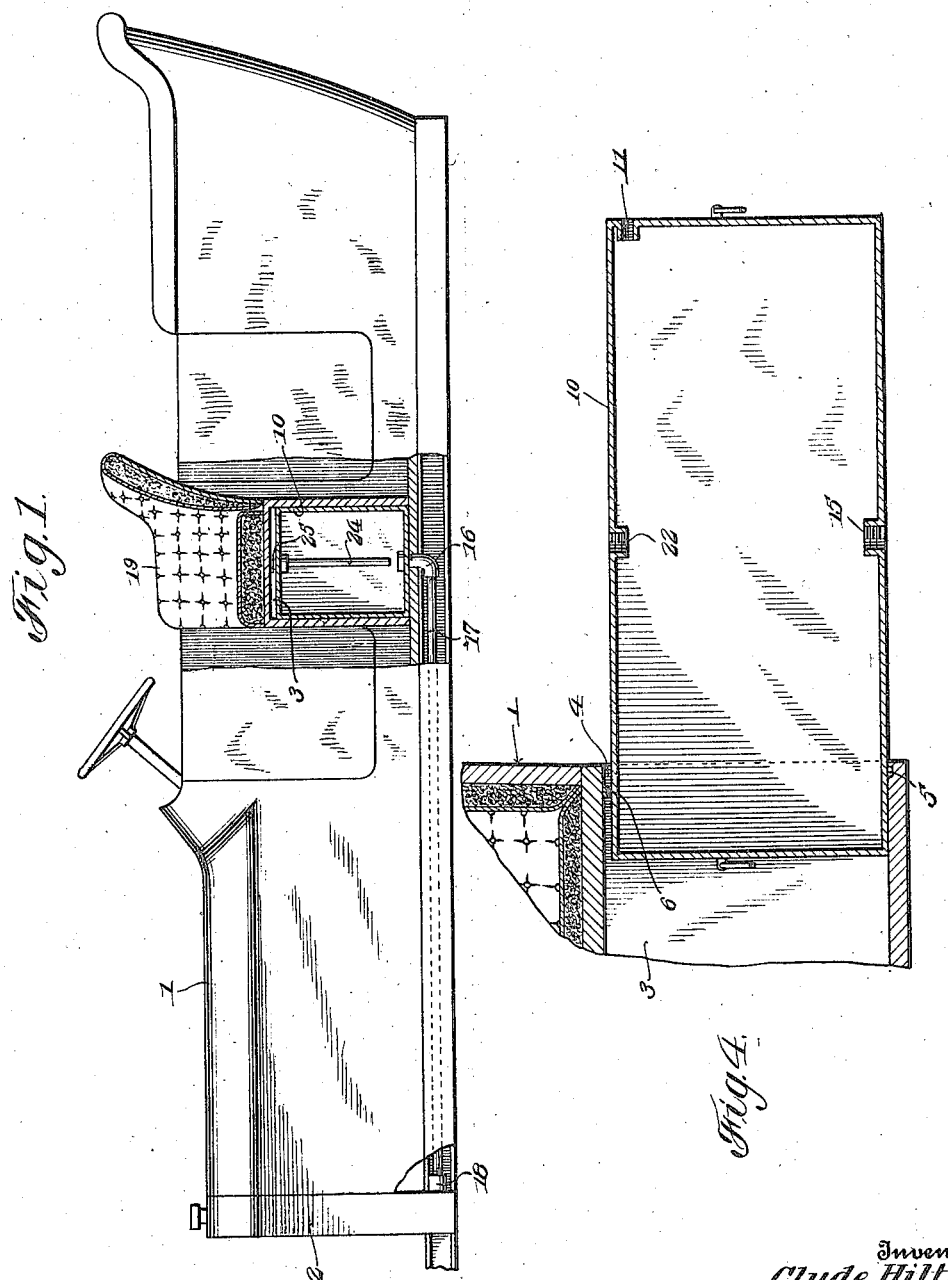

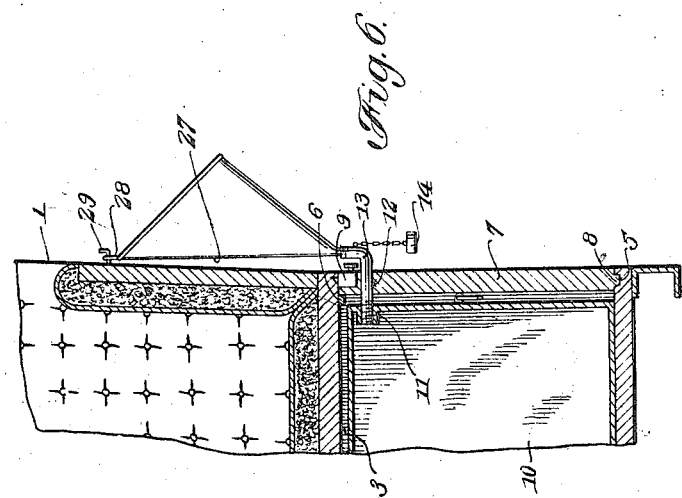

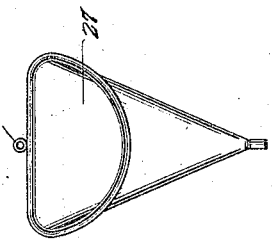
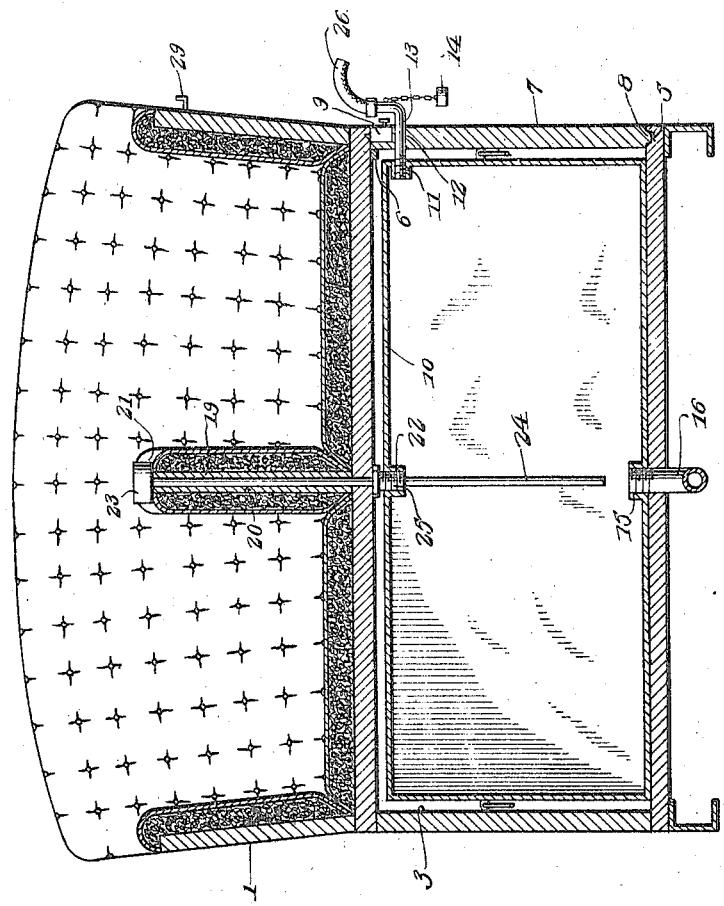

CLYDE HILTS, OF ROME, NEW YORK.

MOTOR-VEHICLE APPLIANCE.

1,234,026.

Specification of Letters Patent. Patented July 17, 1917.

Application filed February 9, 1915. Serial No. 7,201.

*To all whom it may concern:*

Be it known that I, CLYDE HILTS, a citizen of the United States, residing at Rome, in the county of Oneida and State of New York, have invented new and useful Improvements in Motor-Vehicle Appliances, of which the following is a specification.

This invention relates to improvements in appliances or appurtenances for motor vehicles, and has particular application to a water tank for maintaining the water in a cooling system of the engine at a constant elevation.

In carrying out the present invention it is my purpose to provide a water reservoir or tank that will be carried by the motor vehicle below the front seat thereof and which may be readily removed from the vehicle when desired.

It is also my purpose to provide a tank of the class described which may be rapidly and conveniently filled with water or other cooling fluid and which will be provided with a gage disposed within the vision of the operator of the vehicle so that the water level within the tank may be at all times ascertained.

A further object of my invention is to construct the body of the vehicle in such manner that a tank may be moved into the space below the front seat of the vehicle and moved out of such space by way of an opening in the side of the vehicle and wherein such opening may be effectively closed and the closure form, in effect, a part of the side wall of the vehicle.

With the above and other objects in view, the invention consists in the construction, combination and arrangement of parts hereinafter set forth in and falling within the scope of the claims.

In the accompanying drawings:—

Figure 1 is a fragmentary side elevation of a motor vehicle equipped in accordance with the present invention, parts being shown in section;

Fig. 2 is an enlarged fragmentary longitudinal sectional view through the vehicle;

Fig. 3 is a transverse sectional view therethrough;

Fig. 4 is a fragmentary cross sectional view through the vehicle, showing the closure removed and the tank partly withdrawn;

Fig. 5 is a front elevation of a funnel for use in filling the tank; and

Fig. 6 is a fragmentary cross sectional view, showing the funnel in use, the funnel being shown in side elevation.

Referring now to the drawings in detail, 1 designates a motor vehicle of any well known type, such vehicle being driven by an internal combustion engine provided with a cooling system including a radiator 2 located at the forward end of the vehicle body as usual and connected with the water jackets of the engine cylinders in the well known manner. The body of the vehicle below the front seat is formed to provide a chamber 3 extending across the vehicle frame and substantially rectangular in cross section, and one end of the chamber 3 opens onto the adjacent side of the vehicle as at 4. Formed in the bottom wall of the chamber 3 adjacent to the open end thereof is a transverse groove 5, while formed on the top wall of the chamber 3 adjacent to the open end thereof and inwardly of the groove 5 is a transverse rib 6.

7 designates a closure adapted to close the open end of the chamber 3 and in the form of a substantially rectangular plate having the lower edge thereof formed with a depending longitudinally extending rib 8 designed to seat within the groove 5 and the upper edge adapted to abut against the rib 6, the upper edge of the closure 7 being provided with a suitable form of latch 9 adapted to enter a recess in the top wall of the chamber to lock the closure in position. When the rib 8 is seated within the groove 5 and the latch 9 in engagement with the recess in the top wall of the chamber, the closure is held within the open end of the chamber thereby closing such end and the outer surface of the closure lies flush with the adjacent side wall of the vehicle body so as to provide a continuous smooth surface and maintain the neat appearance of the body.

Disposed within the chamber 3 and capable of removal therefrom by way of the open end of the chamber is a tank 10 shaped to conform to the shape of the chamber and having the end wall thereof adjacent to the closure 7 formed in proximity to the top of the tank with an inlet opening 11 registering with an opening 12 formed in the closure 7. Passed through these registering openings and threaded into the opening 11 in the tank is the inner end of a supply nozzle 13, such nozzle having the outer end portion thereof bent upwardly at right angles to itself and threaded to receive a closure cap 14. In the present instance the bottom of the tank 10 is formed approximately centrally thereof with an outlet opening 15 registering with an opening in the bottom wall of the chamber 3 and passed through these registering openings is one end of an outlet nipple 16 threaded into the opening 15 and having the outer end portion thereof bent at right angles to itself and lying in a horizontal plane. Suitably secured to the extremity of the horizontal portion of the outlet nipple 16 is a conveying pipe 17 extending toward the front end of the vehicle and having the forward extremity thereof connected with a nipple 18 secured to the lower end portion of the radiator 2 of the cooling system of the engine. In this instance the front seat of the vehicle is provided with a central partition 19 and formed in the partition 19 approximately centrally thereof is a vertical bore 20 having the upper end thereof opening into an annular seat 21 formed in the upper edge of the partition and the lower end registering with an opening 22 in the top wall of the tank 10. Disposed within the annular seat 21 is a water gage 23 and secured to the water gage 23 and extending through the bore 20 and the opening 22 is a controlling tube 24 having the lower end terminating a short distance above the bottom wall of the tank 10. By means of the tube 24 and the gage 23 the level of the water within the tank 10 may be at all times determined. Threaded into the opening 22 and surrounding the tube 24 is a packing gland 25 serving to form a fluid-tight joint between the tube and the wall of the opening.

In order to fill the tank 10, the cap 14 is removed and if the tank is to be filled from a faucet or the like, a hose 26 has one end threaded onto the filling nozzle 13 and the opposite end connected with the faucet so that the water will be delivered to the tank when the valve is open. On the other hand, when a faucet and hose are not convenient, the funnel shown in Figs. 5 and 6 is employed, and this funnel is formed with a flat wall 27 adapted to lie against the side of the car body above the nozzle 13, while the spout extends into such nozzle. Secured to the edge of the flat wall 27 of the funnel is a ring 28 designed to engage a hook 29 secured to the wall of the vehicle body, such ring and hook supporting the funnel in filling position. The water may now be poured into the funnel rapidly and will pass into the tank 10.

From the foregoing description, taken in connection with the accompanying drawings, the construction, and manner of employing my invention will be readily apparent. It will be seen that I have provided an auxiliary tank for the cooling system of motor vehicles whereby the water level within the cooling system will be at all times maintained constant, while the tank may be filled whenever necessary and removed from the chamber below the seat of the vehicle. Furthermore, it will be noted that the driver of the vehicle may at any time ascertain the level of the water in the tank by consulting the gage 23.

While I have herein shown and described certain preferred forms of my invention by way of illustration, I wish it to be understood that I do not limit or confine myself to the precise details of construction herein described and delineated, as modification and variation may be made within the scope of the claim without departing from the spirit of the invention.

I claim:—

The combination with a motor vehicle having a chamber formed in the body thereof and opening onto one side wall of the body, a closure for the open end of the body, a tank within said chamber, a filling nozzle connected with one end wall of said tank and projecting outwardly through said closure, and means on the side wall of the vehicle above said nozzle to support a funnel and hold the neck of the funnel in the nozzle.

In testimony whereof I affix my signature in presence of two witnesses.

CLYDE HILTS.

Witnesses:
 WALTER HILTS,
 EZRA HILTS.

Copies of this patent may be obtained for five cents each, by addressing the "Commissioner of Patents, Washington, D. C."